UNITED STATES PATENT OFFICE.

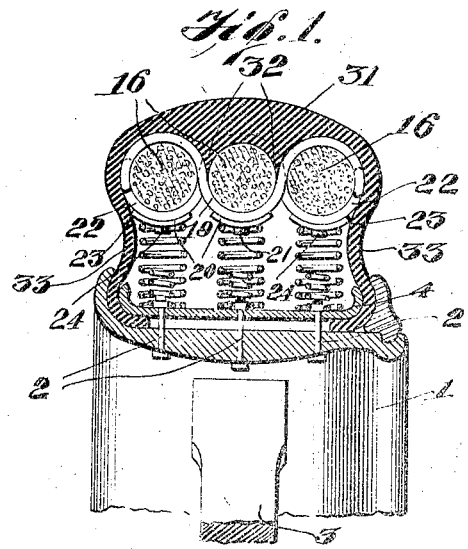
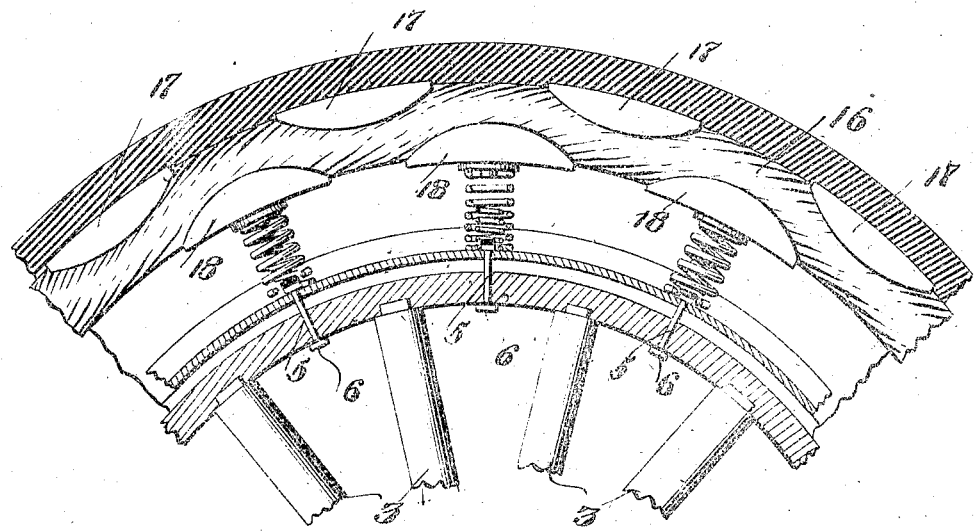

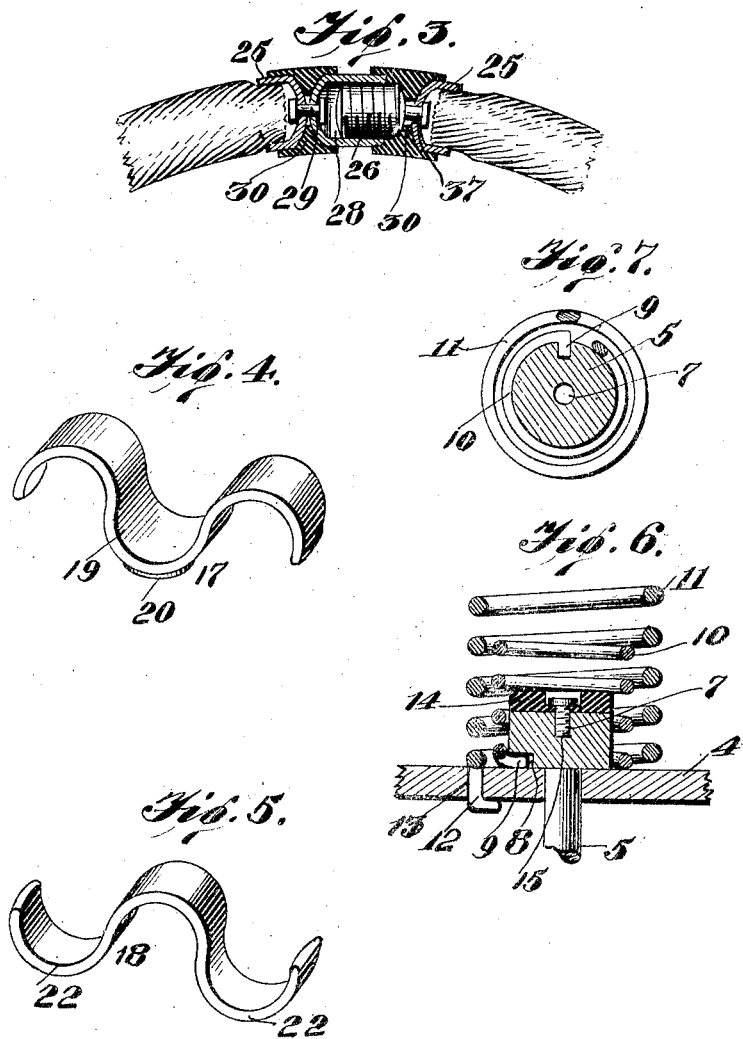

NIRAM A. SCHNEIDER, OF MITCHELL, SOUTH DAKOTA.

AUTOMOBILE SPRING-TIRE.

1,005,332.

Specification of Letters Patent. Patented Oct. 10, 1911.

Application filed November 29, 1910. Serial No. 594,736.

*To all whom it may concern:*

Be it known that I, NIRAM A. SCHNEIDER, a citizen of the United States, residing at Mitchell, in the county of Davison and State of South Dakota, have invented certain new and useful Improvements in Automobile Spring-Tires, of which the following is a specification, reference being had therein to the accompanying drawing.

This invention relates to tires and the principal object of the same is to produce a tire which is resilient but at the same time does not require to be inflated with air and thus the danger of sustaining a puncture and running on a flat tire is obviated.

This invention is illustrated in the accompanying drawings wherein:

Figure 1 is a transverse sectional view through the tire showing the same applied to a wheel. Fig. 2 is a longitudinal sectional view through the improved tire, a portion of the same being shown in elevation. Fig. 3 is an enlarged view of the couplings which join the ends of the ropes. Fig. 4 is a perspective view of one of the equalizers. Fig. 5 is a perspective view of another one of the equalizers. Fig. 6 is an enlarged sectional view through the springs. Fig. 7 is a transverse sectional view through the springs.

In the accompanying drawings it will be seen that the numeral 1 indicates the rim of a wheel which is provided with a plurality of sets of openings 2, each of the sets being located between the spokes 3, and in the illustrated form consisting of three openings. A channel plate 4 is placed upon the rim 1 and is provided with a series of openings which register with the openings formed through the rim so as to permit of the passage of securing bolts 5 which are held in place by means of the nuts 6. The head of each of the bolts is provided with a threaded opening 7 in its upper surface and with an opening 8 in one of its sides which receives the end 9 of a small coil spring 10 to hold the same in place. A larger spring 11 surrounds the spring 10 and has its end 12 passing through an opening 13 formed in the plate 4 and turned to rigidly secure the spring in place. A rubber washer 14 is secured upon the head of the bolt 5 by means of a screw 15 which passes through a central opening and into the threaded opening of the bolt—the head of the bolt being counter-sunk.

A number of rope strands 16 are connected together by means of the curved equalizers 17 and 18. The equalizers 17 are provided at their central curved portion 19 with a bearing plate 20, which has depending from its center a lug 21. The equalizers 18 are provided on the surface of the outer curved portions 22 with similar bearing plates 23 which are provided with lugs 24. The free ends of the spring 11 contact with the bearing plates and the lugs fit within the spring thus holding the spring in position. By means of having these equalizers the ropes are held even and form a continuous band which forms the tread portion of the tire. The strands of rope have their ends connected at different points around the circumference of the tire so that there will not be formed a weak point as would be the case if all of the strands met at the same place. The strands are provided at their ends with caps 25 which are provided with central openings. A threaded core 26 is rotatably secured within one of the openings by means of its shank 37 which passes through the opening and is provided with an enlarged inner end and a threaded socket 28 is rotatably connected with the other cap by means of a bolt 29. The spaces between the caps and the socket and core are filled by elastic bands 30 which form a strong joint. When the socket is threaded upon the core said joint is braced by means of the elasticity of the bands which will cause a very tight joint to be formed.

An outer casing 31 which is preferably made of rubber or the like (but can be made of any suitable material) is provided on its inner surface with a plurality of ribs 32 which fit between the strands of rope 16 and thus form a very solid tread portion. The side portions 33 are secured between the rim 1 and the channel plate 4 and the tire is thus rigidly but detachably held to the rim. By means of this structure a tire is formed which is resilient and which will stand a great deal of pressure.

If the pressure or a sudden jolt causes the springs 11 to be compressed more than ordinarily, the bearing plates come in contact with the springs 10 which take up the extra pressure and thus save the equalizers from coming in contact with the bolts 5. However, if the jolt should be great enough to bring the lugs 21 in contact with the inner ends of the bolts the jar would be very slight and would be taken up by the rubber washers 14, so that there is no injury done.

Having described the invention, what I claim is:

1. A tire comprising a channel plate, bolts for securing said channel plate to a wheel rim, the head of each of said bolts provided with a central threaded socket and with a side socket, a resilient washer, a screw passing through said washer and within said threaded opening to hold said washer upon said bolt, a spring surrounding said head and having its end fitted within said side opening, a relatively larger spring surrounding said first-mentioned spring, and secured to said channel plate, the tread portion resting upon said larger springs, and a casing surrounding said tread portion and adapted to be secured between said channel plate and the rim of a wheel.

2. A tire comprising a channel plate, bolts securing said channel plate to the rim of a wheel, a spring secured to the head of each of said bolts, a relatively larger spring surrounding said first mentioned spring and secured to said plate, a tread portion resting upon said larger springs, and a casing surrounding said tread portion and springs adapted to be secured between said channel plates and the rim of a wheel.

3. A tire comprising a tread portion formed from a plurality of strands, means connecting said strands together, the ends of each of said strands being provided with a cap having a central opening, a threaded core provided with a shank rotatably mounted within the opening of one of said caps, a socket piece, a bolt rotatably connecting said socket piece to the other of said caps, an elastic band between each of said caps and said core and socket piece, and overlapping said socket when said socket is threaded upon said core, elastic means supporting said tread portion, and a casing for said tire.

4. A tire comprising a plate, springs secured to said plate, a tread portion resting upon said springs, said tread portion having a plurality of longitudinal sections, a casing surrounding said tread portion, said casing provided on its inner surface with a plurality of longitudinal ribs fitting between the sections of said tread, and said casing adapted to be secured between said plate and the rim of a wheel.

In testimony whereof I hereunto affix my signature in presence of two witnesses.

NIRAM A. SCHNEIDER.

Witnesses:
SAMUEL F. ROWELL,
CHARLES S. WILCOX.